United States Patent [19]

Freitas

[11] Patent Number: 5,563,890

[45] Date of Patent: Oct. 8, 1996

[54] SONET/SDH POINTER JUSTIFICATION GAP ELIMINATION CIRCUIT

[75] Inventor: Oscar W. Freitas, Cape Elizabeth, Me.

[73] Assignee: National Semiconductor Corporation, Santa Clara, Calif.

[21] Appl. No.: 490,294

[22] Filed: Jun. 14, 1995

[51] Int. Cl.$^6$ .................................. H04J 3/07; H04L 7/00
[52] U.S. Cl. ........................ 370/99; 370/102; 370/105.3; 375/363; 375/372
[58] Field of Search .................................. 370/58.1, 58.2, 370/58.3, 60, 60.1, 79, 82, 83, 84, 94.1, 94.2, 99, 101, 102, 105.1, 105.3, 110.1, 111, 112; 375/363, 371, 372, 373, 376

[56] References Cited

U.S. PATENT DOCUMENTS

| | | | |
|---|---|---|---|
| 5,172,376 | 12/1992 | Chopping et al. | 370/102 |
| 5,263,056 | 11/1993 | Urbansky | 370/102 |
| 5,384,774 | 1/1995 | Martin et al. | 370/102 |
| 5,428,612 | 6/1995 | Scheffel et al. | 370/84 |

Primary Examiner—Alpus H. Hsu
Attorney, Agent, or Firm—Daniel H. Kane, Jr.; Chris A. Caseiro

[57] ABSTRACT

A pointer processor circuit substantially eliminates the pointer gap during justification of an outgoing SONET/SDH frame relative to an incoming SONET/SDH frame. The pointer interpreter circuit PI is constructed to receive an incoming frame, interpret the pointer H1H2, and write data payload bytes of the incoming frame into a FIFO memory. An input clock CLK1 controls the writing of data payload bytes into the FIFO. The FIFO stores only data bytes. A pointer generator circuit PG is coupled to the FIFO and is constructed to read out data payload bytes from the FIFO, create an outgoing frame, and calculate a new pointer. An output clock CLK2 controls reading of data from the FIFO to form an outgoing frame. The PI, FIFO and PG cooperate for justification of the outgoing frame relative to the incoming frame. The PG is constructed to determine the time X between justifications, to count justifications, and to determine the occurrence of N justifications corresponding to a row N data payload bytes of the SONET/SDH frame in the time (N-1)X adjacent to a pointer gap time interval (R+1)X of no justifications corresponding to R transport overhead bytes of the row. The PG is also constructed to average approximately and spread out the justifications over the interval X (N+R) by spacing the justifications to occur at intervals of approximately X (1+R/N), thereby substantially eliminating the pointer gap. Whole integer approximations are typically used for spacing the justifications during justification steps along a row of the SONET/SDH frame.

15 Claims, 9 Drawing Sheets

SONET/SDH POINTER JUSTIFICATION GAP ELIMINATION CIRCUIT

TECHNICAL FIELD

This invention relates to a new pointer processor circuit for processing SONET/SDH frames. The pointer processor provides justification between an outgoing frame and an incoming frame as data bytes are written from the incoming frame into a FIFO memory by the pointer interpreter and data bytes are read from the FIFO memory by a pointer generator. Specifically the present invention eliminates the pointer justification gap that develops when the transport overhead bytes of a row of a SONET/SDH frame are reached by the pointer processor. Overhead bytes of the SONET/SDH frame are not written to the FIFO or read from the FIFO. Only data bytes are written into and read from the FIFO. The pointer justification gap therefore develops when the pointer processor steps by the transport overhead bytes on a row of the SONET/SDH frame. The gap occurs in the otherwise periodic and regular justifications. The present invention eliminates the gap by averaging justifications associated with the data bytes over an entire row of a SONET/SDH outgoing frame including the data bytes and transport overhead bytes as the pointer processor steps through the row in justification steps.

BACKGROUND ART

The SONET system is intended for implementing the electronic/photonic interface for fiber optic communication networks according to the new Synchronous Optical Network (SONET) Standard defined in ANSI Standard T1.105 etc. According to the SONET Standard, electronic signals are formatted in synchronous transport signal (STS) frames of 810 bytes with 125 µS frame time period and base transmission rate of 51.840 Mb/s. The STS frames include the transport overhead bytes and a synchronous payload envelope (SPE) of data bytes combined in a standard frame format of 9 rows of bytes of 90 columns of bytes. The basic SONET STS-1 frame is constructed with three columns of transport overhead bytes as the first three columns followed by 87 columns of SPE data bytes. Each row is therefore composed of 3 transport overhead bytes and 87 data bytes. The SPE also includes one column of path overhead bytes.

Within each STS frame the synchronous payload envelope SPE may be composed of so called virtual tributaries (VT's), i.e., data structures from lower speed or lower frequency service networks. The VT's are packaged or multiplexed together in the synchronous payload envelopes of STS frames for high speed SONET transmission. Multiple STS frames can also be multiplexed together in a single STS-N frame structure.

Internationally, the SONET system is referred to as synchronous digital hierarchy or SDH. The basic SDH frame is similar to an STS-3 frame of 9 rows by 270 columns. The rows are divided into an initial 9 columns of transport overhead bytes followed by 261 columns of data bytes. Each row is therefore composed of 9 transport overhead bytes followed by 261 data bytes.

In summary, SONET ANSI T1 sets the standard for the formatting of data into frames of transport overhead bytes and data payload envelopes, the multiplexing of formatted data, processing of frames, scrambling of data for power modulation, and generally the data handling and management for interfacing electronic signals with optical carriers on fiber optic transmission networks.

Figure 1:
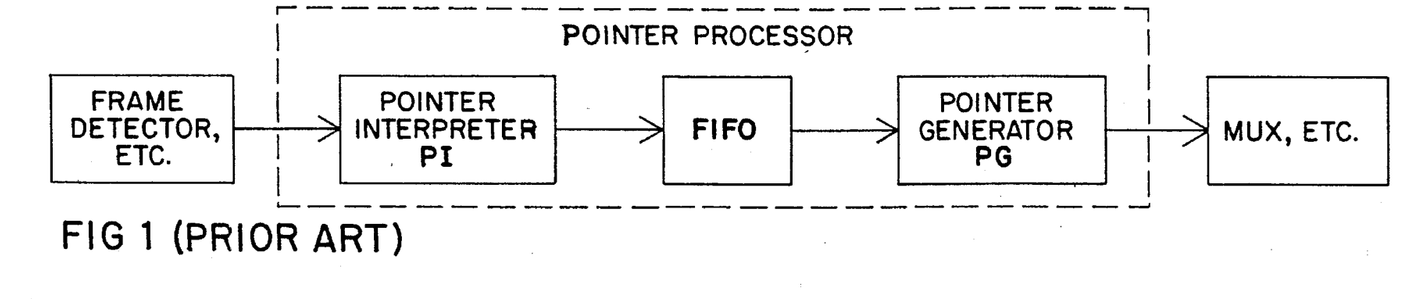
FIG. 1 is a block diagram illustrating a pointer processing circuit.

Referring to FIG. 1, a typical pointer processor circuit consists of a pointer interpreter (PI), first in first out memory (FIFO) and a pointer generator (PG). The PI circuit receives an incoming frame, locates the pointer in the transport overhead bytes of the incoming frame identified as the H1H2 bytes, and interprets the pointer which points to and gives the location of the trace byte J1. J1 identifies the start of the synchronous payload envelope of data bytes for that incoming frame. The PI then writes the data bytes of the incoming frame to the FIFO.

The pointer generator constructs a new pointer H1H2 because generally the data payload envelope of data bytes will begin at a different location of the synchronous payload envelope in the outgoing frame compared to the incoming frame. The incoming and outgoing frames are independent of each other. The pointer generator circuit also reads the data bytes from the FIFO and begins constructing a new SONET frame as the outgoing frame.

The pointer processor of the present invention including the PI, FIFO, and PG is part of the overall SONET/SDH frame processing circuit. For example the PI is coupled on the upstream side to a frame detector circuit for detecting overhead bytes from the incoming frame. This circuit checks the incoming framing bytes A1A2 and other overhead bytes. Transport overhead bytes are extracted from the frame and parity bytes are checked.

The PG circuit is coupled to a multiplexing circuit or MUX followed by an overhead insertion circuit for restoring new transport overhead bytes to the outgoing frame. The multiplexer or MUX constructs the frame according to a STS-N formula, parity bits are inserted, and finally the bits are modulated by a feedback scrambler. It is noted that feedback scrambling is not for the purpose of encryption but for modulating power by distributing pulse signal edges.

Figure 1A:
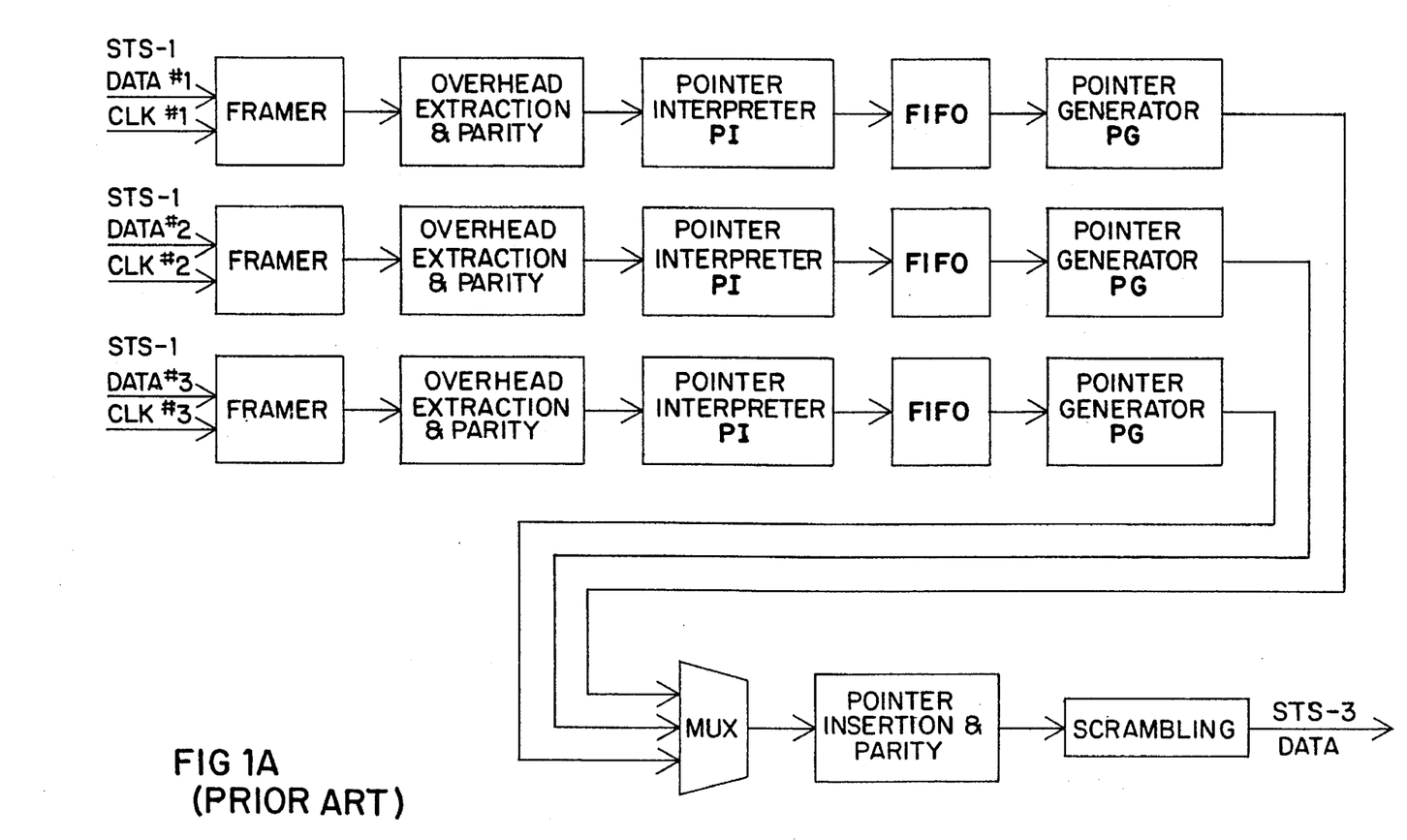
FIG. 1A is a block diagram of a STS-1 to STS-3 multiplexer and transport overhead processor circuit of the SONET system.

The SONET STS frames themselves can be multiplexed into N frame structures. For example a 3 to 1 multiplexer will combine 3 STS-1 frames into a single STS-3 frame as illustrated in FIG. 1A. Synchronous multiplexing is achieved by interleaving bytes at corresponding locations of the respective STS frames after aligning the transport overhead bytes of the respective STS frames. A multiplexed STS-N frame has the same frame time period of 125µS as an STS-1 frame. The SONET Standard accommodates byte interleaved synchronous multiplexing STS-N of at least 48 STS frames. An STS-48 frame results in SONET Signal transmission rates in the 2 gHz range (e.g. 48×51.840 Mb/s).

During pointer processing, writing data bytes in the FIFO, and reading data bytes from the FIFO, several events may require justification by the pointer processor between the outgoing frame and the incoming frame. Justification is required if the incoming frame rate is slightly different from the outgoing frame rate, i.e. if the PI clock and PG clock differ. Justification is required if a data byte is previously written in the transport overhead byte location H3. Justification is also required if a dummy byte, stuff byte, or blank byte is written in the data byte location following the H3 location. Location H3 is designated the negative justification data holding byte location.

If PICLK>PGCLK, an extra data byte coming in is written from the FIFO into the H3 location of the outgoing frame in a negative justification or decrement step. Or a data byte may have been previously written in the H3 location of the incoming frame. It is then used for a negative decrement or negative justification.

If PICLK<PGCLK so that the outgoing frame takes away more bytes than are supplied by the incoming frame, a positive justification or increment is required. The PG writes a dummy byte or blank byte in the outgoing frame at the data byte location following H3. The PG will therefore leave an empty data byte location following H3 to compensate for the shortage of data bytes arriving. Or a previous stage may have written a dummy byte or empty byte in the data byte location following H3. This would prompt a positive justification step or positive increment.

The pointer gap problem arises during justification of the incoming and outgoing frames. Suppose the incoming frame clock (PICLK) is slightly faster than the outgoing frame clock (PGCLK) so that a negative justification or decrement is required every 30 frames. The pointer processor circuit proceeds methodically through each frame and every 30 frames a threshold is crossed that prompts the negative justification. With respect to a particular row of the outgoing frame, the pointer processor circuit shifts one byte every 30 frames. Therefore after 90×30=2700 frames, the pointer processor has stepped along an entire row of the outgoing frames. While stepping through the 87 data bytes of a row, a threshold is crossed and a justification occurs regularly every 30 frames. However upon reaching the three transport overhead bytes, no bytes are written into the FIFO and therefore no justification occurs. The pointer processor therefore steps through 120 frames without any justification occurring.

Figure 2:
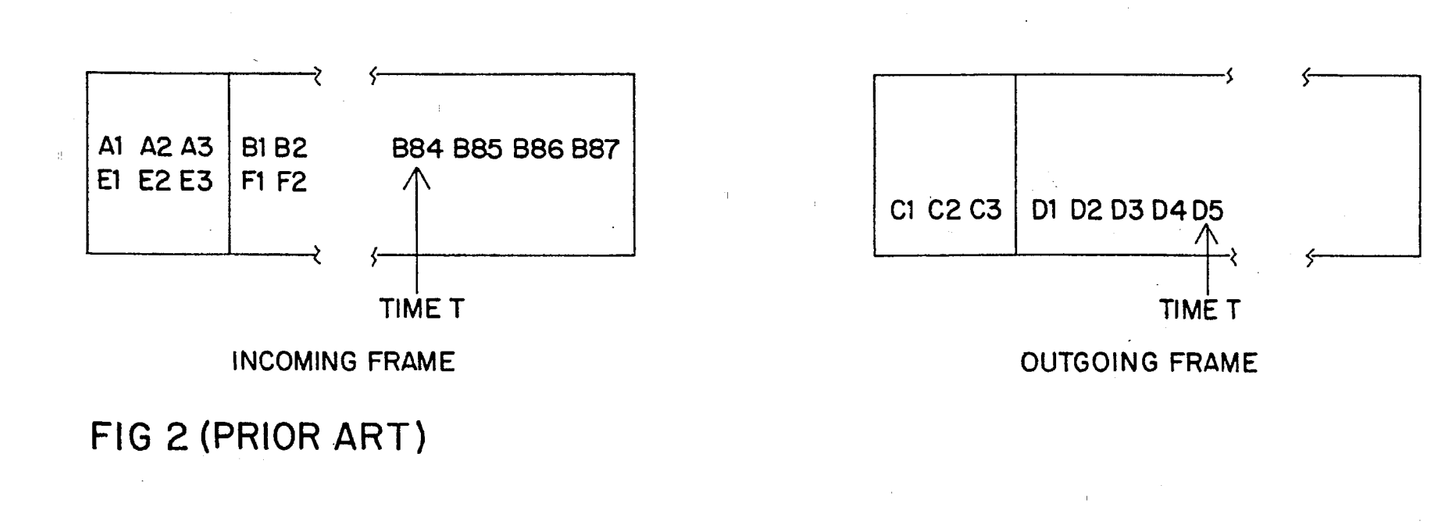
FIG. 2 is a diagrammatic view of an incoming SONET frame and an outgoing SONET frame for illustrating development of the pointer justification gap problem.

This gap in the justifications is called the pointer justification gap or pointer gap. The pointer gap problem causes havoc in the desynchronizers that respond and adapt to the fixed offset of 30 frames established by 87 data bytes of the row. By way of a specific example, reference is made to FIG. 2. FIG. 2 illustrates an incoming SONET frame and an outgoing SONET frame. The first three columns on the left represent transport overhead bytes while 87 columns to the right represent data bytes of the payload envelope.

A possible scenario is at time T (this time is relative to start of outgoing frame) byte B84 is being written to the FIFO while byte D5 is being read from the FIFO. Assuming that the FIFO is filled to Z number of byte initially, then for identically incoming and outgoing frame rates, the FIFO at time T will always have Z bytes even though when the incoming row of the frame is at the overhead positions, the FIFO will be down to (Z-3) bytes and when the outgoing frame is at the overhead positions the FIFO will climb back up to Z bytes.

Now assuming the incoming frame rate is faster than the outgoing frame rate, then there would come a time when at time T, B85 byte would be written to the FIFO instead of B84 byte. This would cause the FIFO to have (Z+1) bytes at time T. At the next opportunity, a pointer justification would occur wherein a slot in the outgoing frame where an overhead typically goes, a data byte would be read from the FIFO. Because of this, at time T in the next frame, there would be Z bytes in the FIFO again.

Some time later, the situation would occur when at time T, B86 would be written to the FIFO instead of B85. The FIFO would have (Z+1) bytes and another justification would occur which would bring the FIFO at time T to Z bytes. If the time difference between the first justification and the second is time X, then when the time comes for B87 to cause a pointer justification, that justification occurs exactly X time units later.

After some time, E1 byte wants to be written to the FIFO but E1 byte is an overhead byte and thus does not get written. So X time units later, the FIFO at time T is still at Z bytes and a justification does not occur. Similarly E2 and E3 overhead bytes do not cause justifications for 2X time units.

Then F1 gets written to the FIFO which causes the FIFO at time T to have (Z+1) bytes and causes a justification. Henceforth the justifications occurs periodically spaced at X time units apart. This, in a nutshell, is the pointer justification gap problem.

One way of avoiding the problem is to use a high frequency clock and write the 87 bytes of data from each row of the incoming SONET/SDH frame in the FIFO evenly over the 90 byte time slots that exist in a row. That is, each byte is not written when it occurs, but is delayed a small time interval (3/87 of a byte time) on the input side of the pointer processor and FIFO. The disadvantage to this method is that one usually does not have a high speed clock or that the technology used to implement the function does not allow one to use such a high frequency clock, for example a 155 MHz clock in CMOS technology.

OBJECTS OF THE INVENTION

It is therefore an object of the present invention to provide a new pointer processor circuit that eliminates the pointer justification gap problem. It is an object of the invention to accomplish this without requiring unusual high speed clocks.

Another object of the invention is to eliminate the pointer gap problem by substantially averaging justifications, that is substantially equally spreading justifications across an entire row of a SONET/SDH frame including data bytes and overhead bytes as a pointer processor steps through a row by justification steps. The pointer processor circuit therefore accomplishes this on the PG output side of the circuit.

A further object of the invention is to provide a pointer processor circuit that measures the time interval X between justifications, counts justifications, and determines the occurrence of 87 substantially regular and repeated justifications in the interval 86X followed by a pointer gap of no justifications for a 4X interval. The pointer processor is then able to substantially average justifications over the interval 90X.

DISCLOSURE OF THE INVENTION

In order to accomplish these results the present invention provides a new pointer processing circuit for substantially eliminating the pointer gap during justification of an outgoing SONET/SDH frame relative to an incoming SONET/SDH frame by the pointer processing circuit. The SONET/SDH frames have byte locations arranged in columns and rows of the frame, including transport overhead bytes and data payload bytes. The transport overhead bytes include a pointer H1H2 followed by a negative justification data holding byte location H3.

According to the invention a pointer interpreter circuit (PI) is constructed to receive an incoming frame, interpret the pointer H1H2 from transport overhead bytes of the incoming frame pointing to the start of data payload bytes of the incoming frame, and write data payload bytes of the incoming frame into a first in first out memory (FIFO). An input clock controls the writing of data payload bytes into the FIFO. The FIFO is coupled to the PI for writing data payload bytes of the incoming frame in the FIFO and for storing only data payload bytes.

A pointer generator circuit (PG) is coupled to the FIFO and is constructed to read out data payload bytes from the FIFO, create an outgoing frame, and calculate a new pointer for the transport overhead bytes pointing to the start of data payload bytes for the outgoing frame. An output clock controls reading of data from the FIFO by the PG to form an outgoing frame.

The PI, FIFO and PG cooperate for justification of the outgoing frame relative to the incoming frame in case there is variance between the input clock and output clock, in case a data byte was previously written in the negative justification data holding byte location H3, or in case a dummy byte is written in a positive justification data holding byte location following H3.

The pointer generator PG is constructed to determine the time X between justifications, to count justifications, and to determine the occurrence of N justifications corresponding to justification steps through a row of N data payload bytes of the frame in the time (N-1)X adjacent to a pointer gap time interval (R+1)X of no justifications corresponding to R transport overhead bytes of the row. The PG is also constructed to average approximately the justifications over the interval X (N+R) by spacing the justifications to occur at intervals of approximately X (1+R/N). An advantage of this averaging is that the justifications are approximately equally spread across an entire row of SONET/SDH frames including transport overhead bytes and data bytes thereby substantially eliminating the pointer justification gap.

In the case of SONET frames constructed with 9 rows and 90 columns, the first three columns are transport overhead bytes followed by 87 columns of data payload bytes. In that case the PG spaces the justifications to occur at intervals of approximately X (1+3/87). For compounded frames e.g. STS-3, STS-12, STS-24, STS-48, etc., the pointer generator circuit is also applicable. The same formula is applicable in multiples of the basic SONET frame. If the compounded frame is broken up into STS-1 frames, then the basic frame formula is applicable. In the case of SDH frames constructed with 9 rows and 270 columns, the first 9 columns are transport overhead bytes followed by 261 columns of data payload bytes. In the case of SDH the PG spaces the justifications to occur at intervals of approximately X (1+9/261). The SDH frames can also be compounded and the applicable formula is also a multiple of the base formula. If the compounded frame is broken up into individual base frames, then the SDH base frame formula is applicable.

A feature of the invention is that the pointer processor circuit is applicable for both positive and negative justifications. If the input clock CLK1 is greater than the output clock CLK2 (CLK1>CLK2) or if an extra data byte has already been written into the data justification data holding byte location H3, then the PG performs negative justifications or decrements. If CLK1 is less than CLK2 or if a dummy byte or stuff byte has previously been written in the data payload byte location following H3, then the PG performs positive justifications or increments.

It is frequently convenient to round off the numbers to whole integers in setting up the intervals between justifications. Consider the example where a justification is required every 30 frames. According to the formula this interval should be increased from 30 frames to 30 (1+3/87) between justifications. 30 (1+3/87)=30+90/87=31+3/87. According to the whole integer approximation, this is rounded off to 31 and the 87 justification steps along a row of a frame are separated by intervals of 31 frames. 87×31=2697 which is 3 less than the 2700 frames required to step through a row in justification steps. The missing 3 frames can be placed in the last interval which then encompasses 34 frames. Or, e.g. three intervals spaced 900 frames apart can be changed from 31 to 32 to accommodate the missing 3 frames. In any event the intervals are still substantially equal and any pointer gap of magnitude 120 frames has been avoided. Control of the PG is simplified by the use of the whole integer approximations.

The invention also provides a new method of substantially eliminating the pointer gap during justification of an outgoing SONET/SDH frame relative to an incoming SONET/SDH frame. These steps include interpreting the pointer from transport overhead bytes of an incoming frame at the PI, generating a new pointer at the PG pointing to the start of the data payload byte for an outgoing frame, and justifying the data payload bytes of the outgoing frame relative to the incoming frame.

The method proceeds by measuring the time between justifications and counting justifications to determine the occurrence of a specified number of justifications N over the time interval X(N-1) followed by a pointer gap of no justifications for the time interval (R+1)X. The final step is controlling the PG so that the PG substantially averages justifications over a cycle of readouts (N+R) corresponding to justification steps through a row of a SONET/SDH frame for substantially eliminating the pointer gap. Whole integer approximations can also be used according to the method in setting up the intervals between justifications for spreading the justification steps substantially equally across a row of a SONET/SDH frame.

Other objects, features and advantages of the invention are apparent in the following specification and accompanying drawings.

DESCRIPTION OF PREFERRED EMBODIMENTS AND BEST MODE OF THE INVENTION

A standard practice in the design of integrated circuits is to define the circuit in terms of the logic functions it will perform and this may be expressed in flow charts or a software language. As the circuit evolves it is then described in a hardware description language (HDL) such as VER- ILOG. VERILOG is available from Cadance Design Systems, Inc. of San Jose, Calif. The circuit is expressed in text based VERILOG statements referred to as a VERILOG behavioral netlist. The VERILOG behavioral netlist is equivalent to a program in C.

The VERILOG statements are then converted from the behavioral netlist to a logic gate netlist by a design compiler. An example of such a design compiler is the SYNOPSYS Design Compiler available from SYNOPSYS, Inc., Mountain View, Calif. The design compiler also composes a circuit from the logic gate netlist performing the behavioral functions defined by the VERILOG behavioral netlist. One of the outputs of the SYNOPSYS design compiler is a schematic circuit diagram.

The present invention is disclosed according to this standard practice in the form of flow charts defining the logic function of the circuits. These flow charts and associated text description in the specification can readily be converted to VERILOG statements in a VERILOG behavioral netlist. The VERILOG statements are then translated to logic gates by a design compiler and the design compiler composes a circuit. All of the automated steps by VERILOG and SYNOPSYS are available for translating these flow charts into hardware schematic circuit diagrams. Disclosure of the flow charts and accompanying text in the detail here provided therefore constitute a full and adequate disclosure of the invention.

Figures 3, 3A:
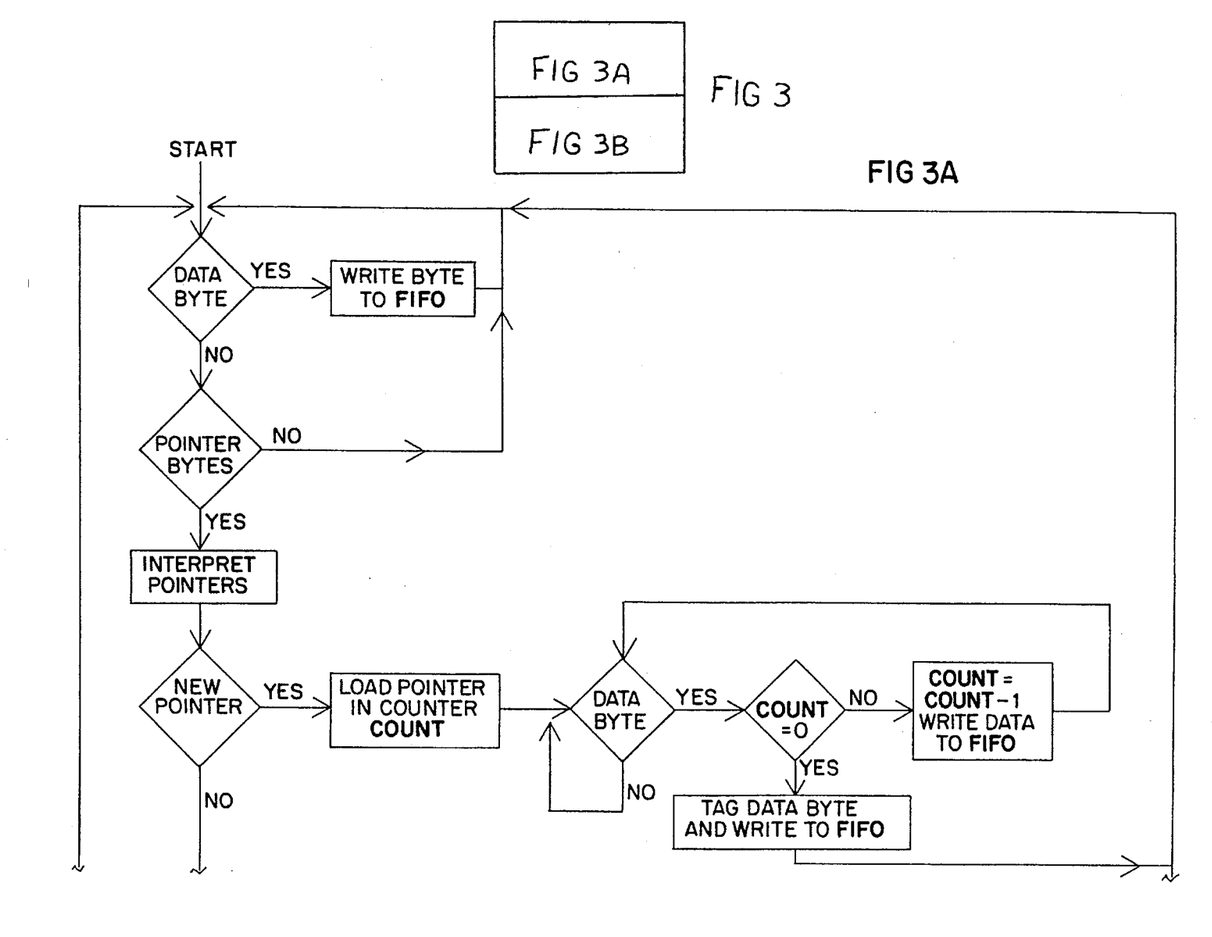
FIG. 3 is composed of FIGS. 3A and 3B.
FIGS. 3A and 3B are a flow chart defining the operation of a pointer interpreter circuit suitable for use in the present invention.
Figure 3B:
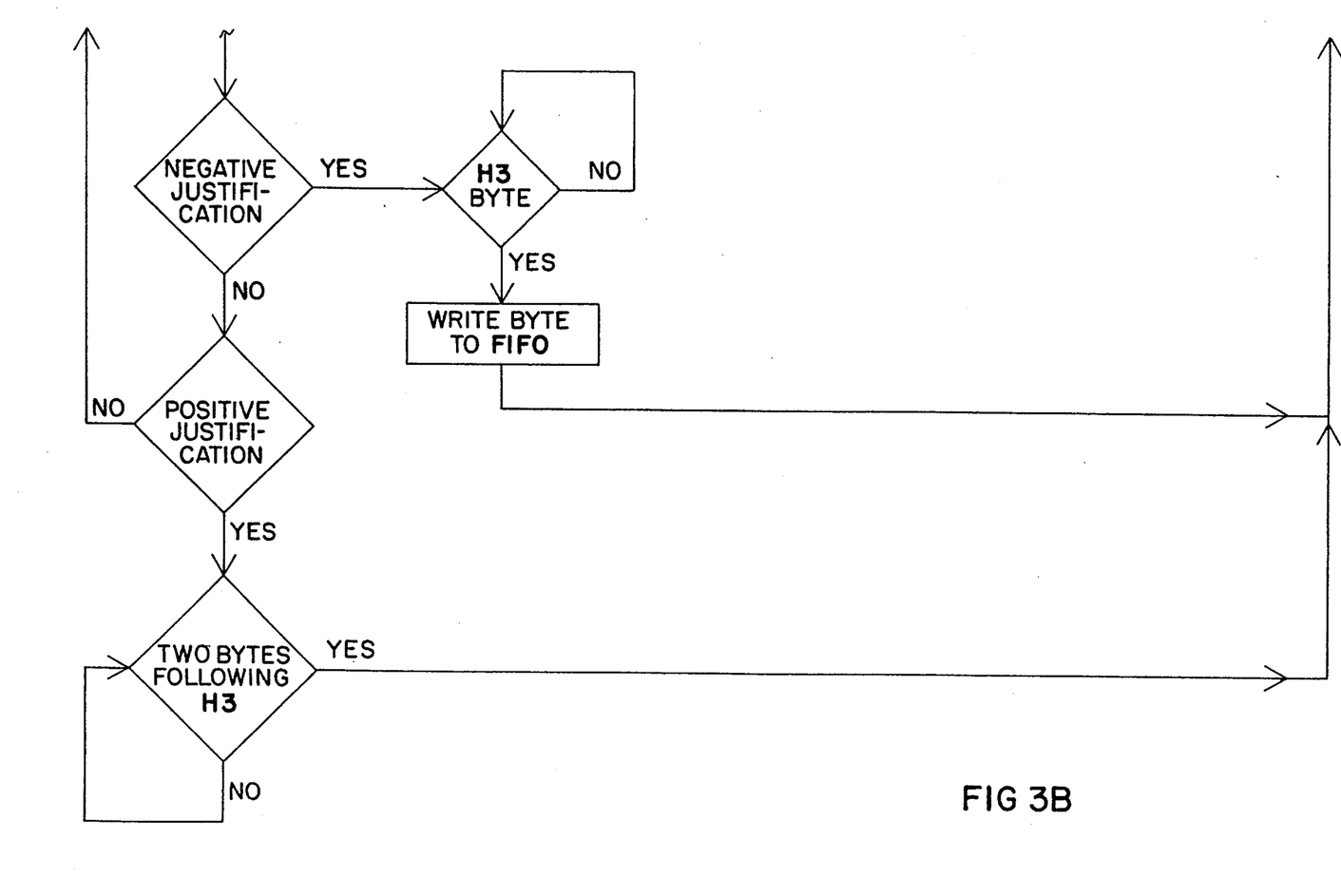

A pointer interpreter circuit suitable for use in the present invention is illustrated in FIG. 3 composed of FIGS. 3A and 3B. Referring to FIG. 3A, the pointer interpreter writes data bytes to the FIFO. Upon reaching the pointer bytes H1H2, the PI interprets the pointer bytes, loads the pointer in a counter, and begins the countdown to the start of the synchronous payload data bytes for that incoming frame. The countdown continues to the J1 trace byte which indicates the start of the payload data bytes. The first data byte of the payload is then tagged so that it will be recognized by the PG and is then sent to the FIFO.

Referring to FIG. 3B, the PI then checks to see if a negative justification is required. If so, the data byte temporarily stored in the negative justification data byte holding location H3 is written to the FIFO. If not the PI checks to see if a positive justification is required. If so the dummy byte or stuff byte following the H3 location is passed over. At the second data byte following H3, the PI resumes transferring data bytes to the FIFO.

Whether or not a negative justification is indicated or a positive justification is indicated can be determined any number of ways. According to one possible method, the pointer bits making up the bytes are alternately designated I bits and D bits. The following convention can be observed. If the majority of D bits are inverted and the majority of I bits are not and NDF bits are normal, then there is a negative justification. Conversely, if the majority of I bits are inverted and the majority of D bits are not, and the NDF bits are new, then there is a positive justification.

Figures 4, 4A:
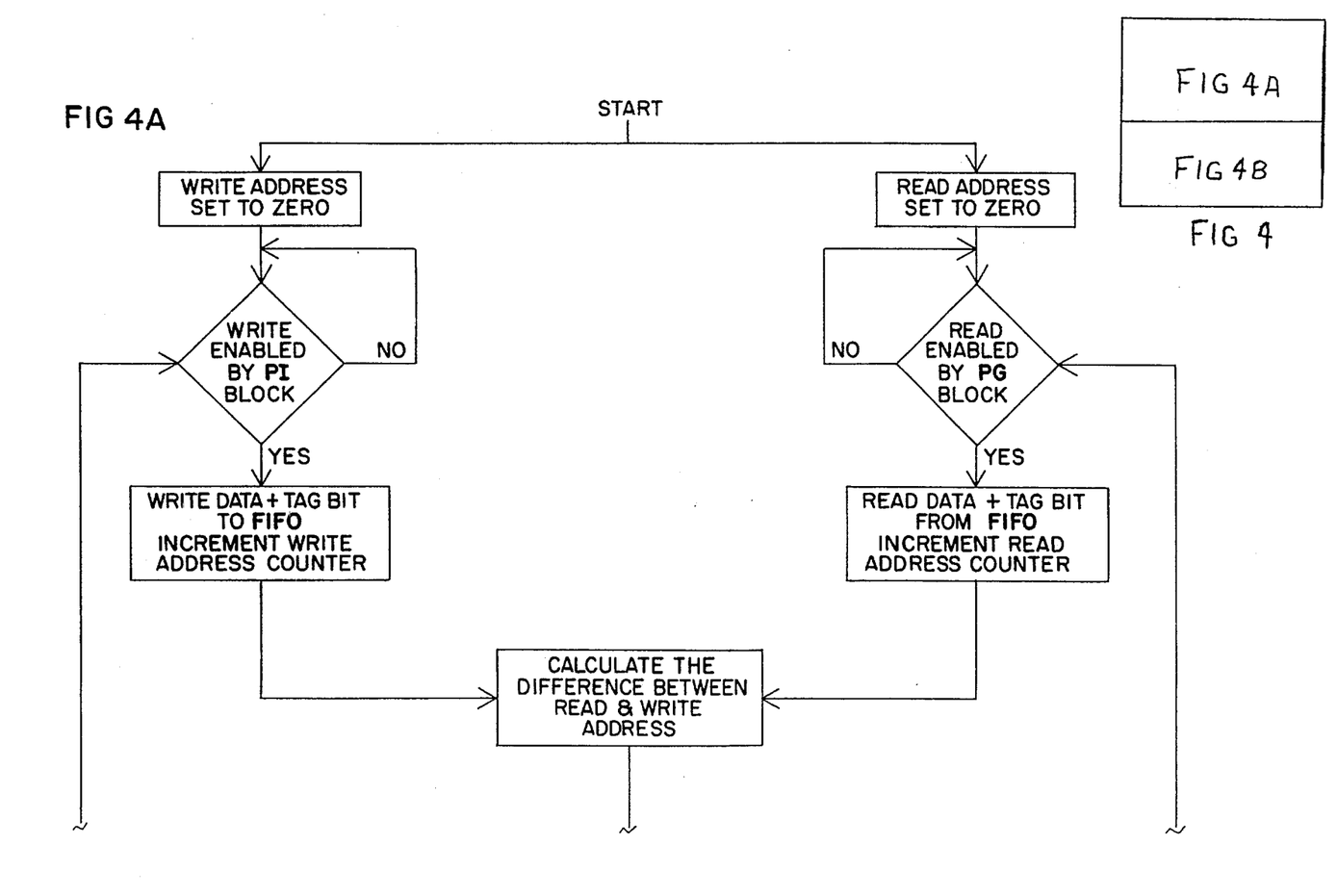
FIG. 4 is composed of FIGS. 4A and 4B.
FIGS. 4A and 4B are a flow chart defining the operation of the first in first out memory (FIFO) controller.
Figure 4B:
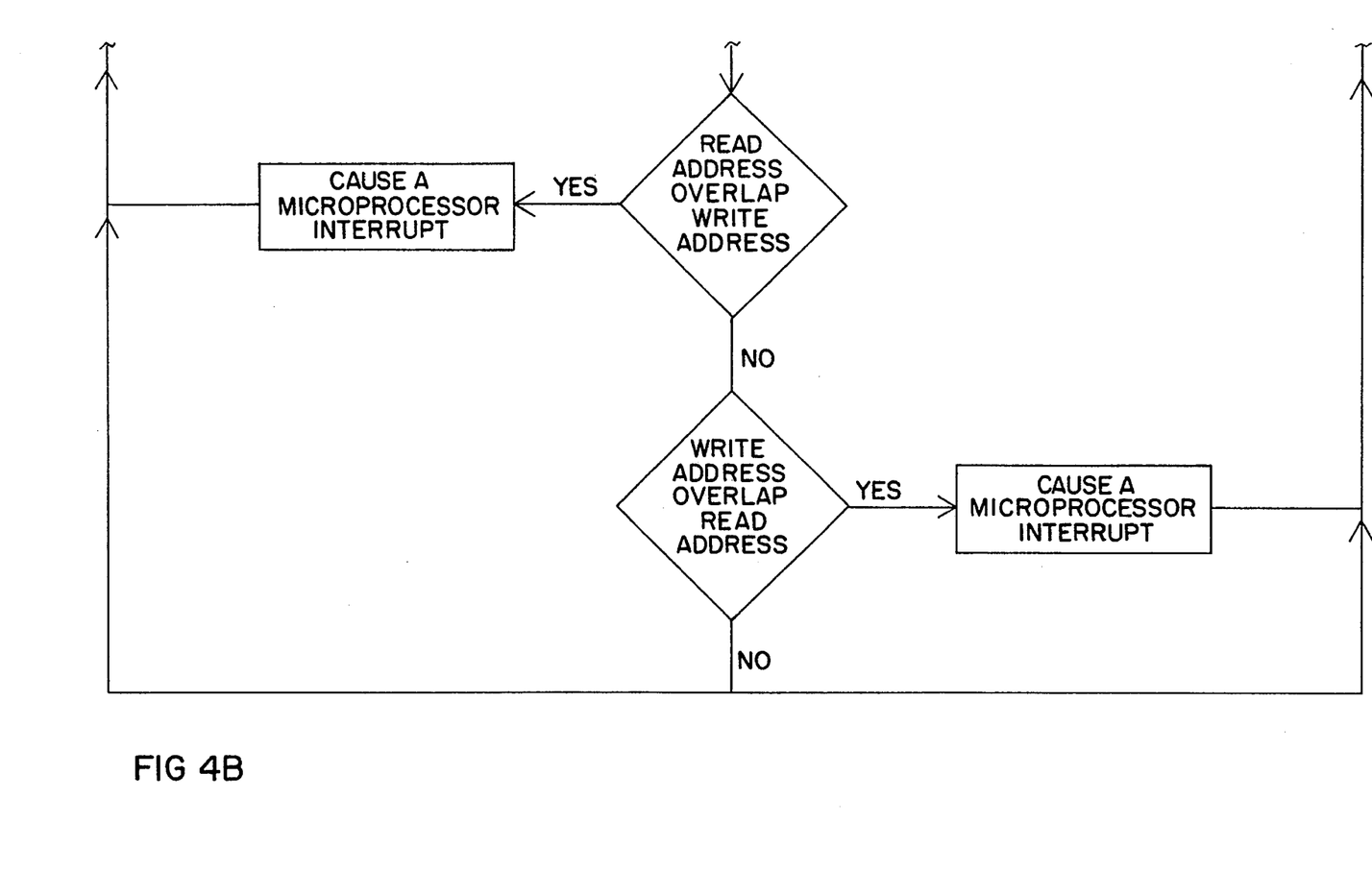

A FIFO control suitable for use in the present invention is illustrated in FIG. 4 composed of FIGS. 4A and 4B. Referring to FIG. 4A, the write cycle is shown on the left side and the read cycle is shown on the right side. The FIFO is typically a 32 byte buffer memory with byte addresses 0–31. The write cycle operates until the FIFO is for example half full, e.g. bytes 0–15, and then the read cycle starts. If the write cycle catches up to the read cycle so that the read address and write address overlap, and the FIFO control attempts to read and write at the same address, an interrupt occurs as shown in FIG. 4B interrupting the write cycle while the FIFO control continues reading. Similarly, if the read cycle overlaps the write cycle, an interrupt occurs interrupting the read cycle while the FIFO control continues writing. Only data bytes are written into and read out of the FIFO.

Figures 5, 5A:
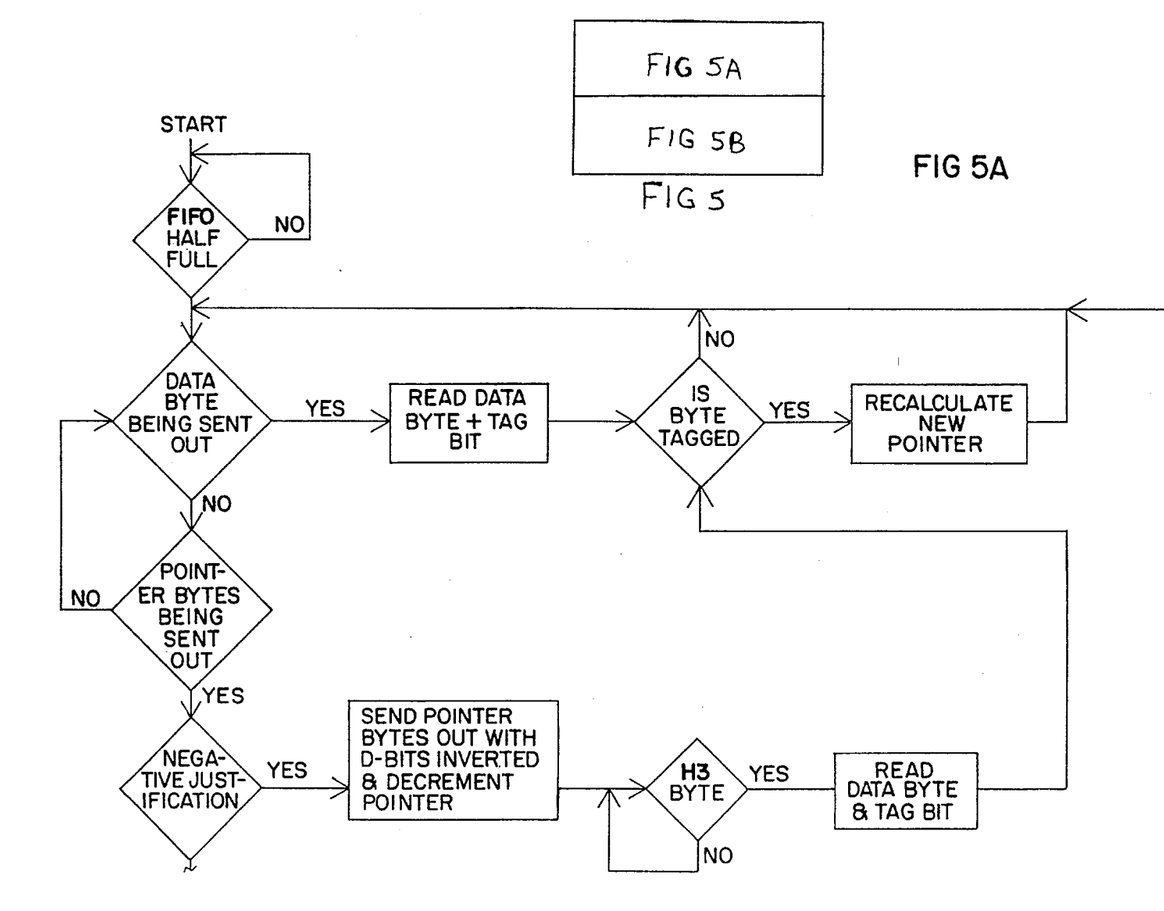
FIG. 5 is composed of FIGS. 5A and 5B.
FIGS. 5A and 5B are a flow chart defining the operation of a generalized pointer generator circuit.
Figure 5B:
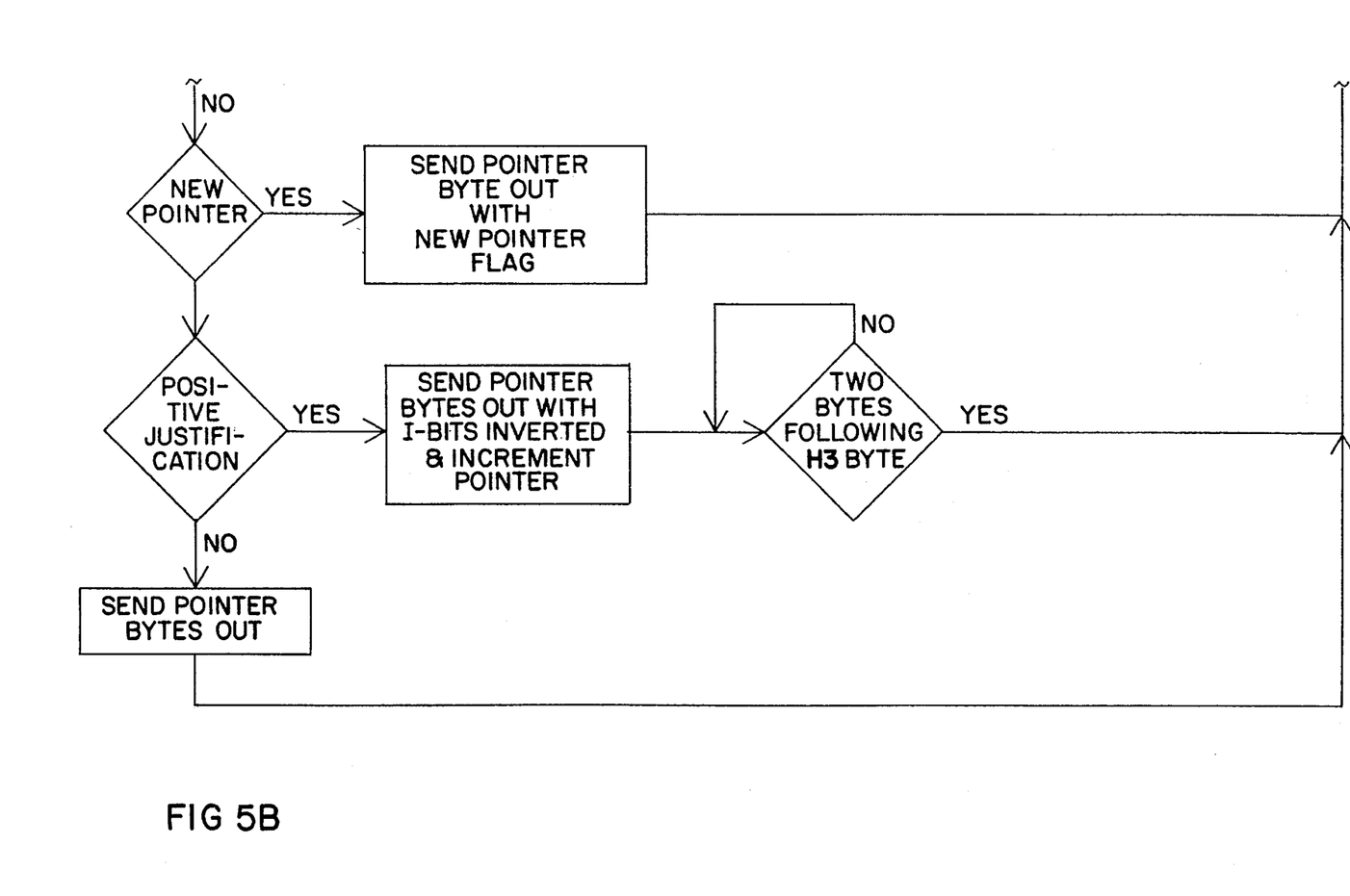

A pointer generator circuit according to the invention is illustrated in FIG. 5, composed of FIGS. 5A and 5B. When the FIFO is half full, the PG begins reading data bytes from the FIFO. The PG determines if the data byte has been tagged. If so that indicates completion of the countdown by the pointer to the start of the payload data bytes of the oncoming frame. The PG can therefore calculate the new pointer based on the data byte going out in the outgoing frame at the time of the start of the payload data bytes of the incoming frame. This is the conventional procedure for recalculating the new pointer.

If a negative justification is required the D bits of the pointer from the incoming frame are inverted and a data byte is written in the negative justification data byte holding location H3. The new pointer is sent out. Alternatively, if a positive justification is required, the I bits of the pointer are inverted and a dummy byte or stuff byte in the form of a blank is written in the payload data byte location following H3. At the second data byte location following H3, normal reading of data bytes from the FIFO by the PG resumes. The gap elimination circuit of the PG for eliminating the pointer justification gap problem is illustrated in FIG. 6.

Figure 6:
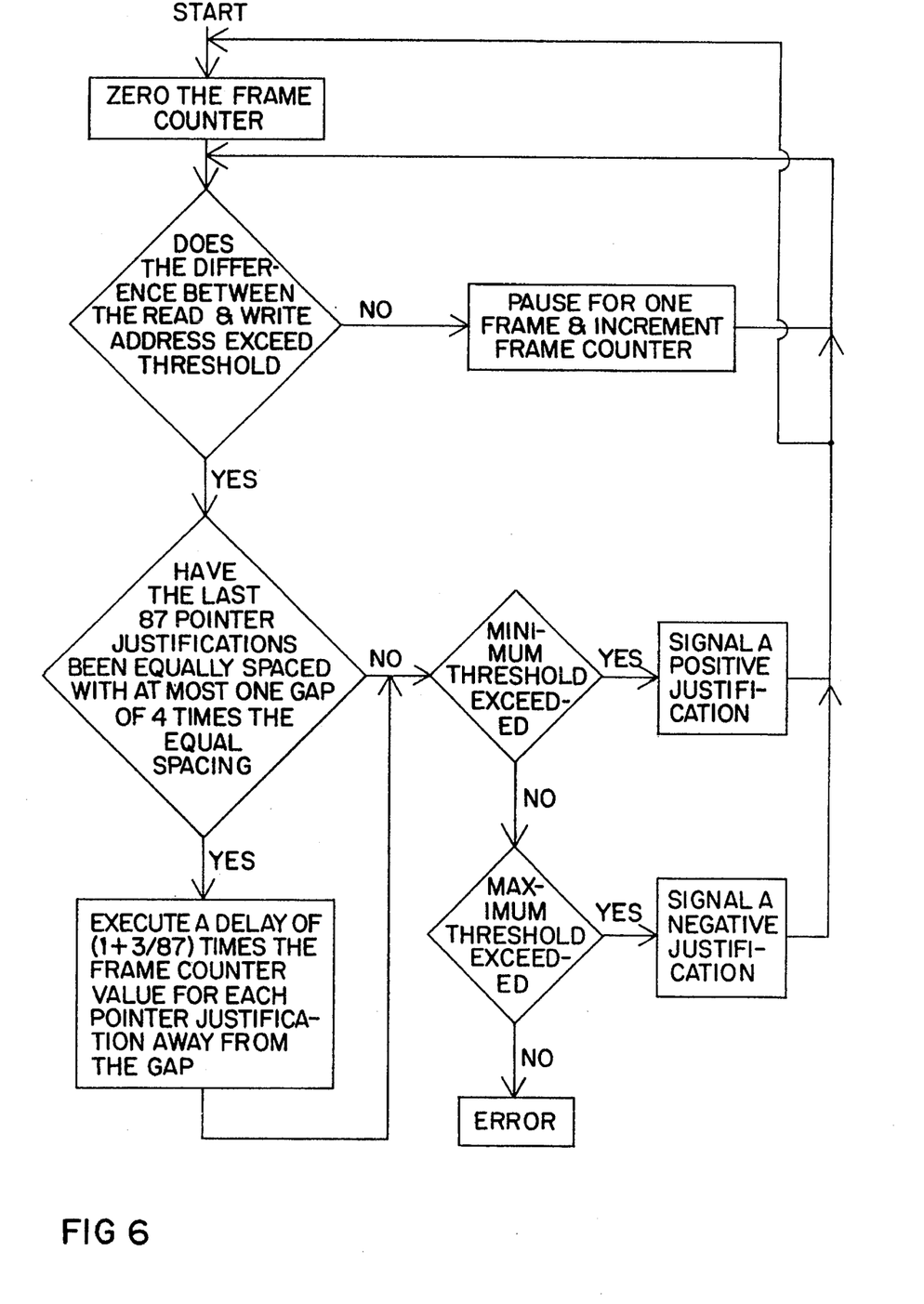
FIG. 6 is a flow chart defining in detail how the pointer generator recalculates the new pointer.

Justification is required if a threshold is exceeded as set forth in FIG. 6. The PG counts the recurring justifications and the time X between justifications. The PG determines whether the last 87 justifications have been approximately evenly spaced over the interval 86X corresponding to the 87 data bytes per row all of which are written to the FIFO. The PG also determines that the 87 justifications over the interval 86X are adjacent to a pointer justification gap of 4X, that is 4 times the substantially equal time spacing X between justifications. The undesirable justification gap 4X corresponds to the three transport overhead bytes per row which are not written to the FIFO.

If the pointer justification gap of that magnitude exists, the PG circuit initiates the following new spacing of the justifications. The PG spaces the justifications by the intervals X (1+3/87). This spacing substantially spreads the intervals and justifications over an entire row of 90 bytes including 87 data bytes and 3 transport overhead bytes. This spacing also substantially eliminates the pointer justification gap. This formula is particularly applicable for the SONET frame. For the SDH frame the row consists of 270 bytes with 261 data bytes and 9 transport overhead bytes. The spacing formula for spacing justifications is therefore X (1+9/261). More generally, where the frame is constructed with rows of N data bytes and R transport overhead bytes, the formula for spacing justification is X(1+R/N).

The number 87 is selected only because an incoming STS-3 is broken into STS-1's. In the general case for STS-1 this can be 87N evenly spaced justifications in a 86NX time interval followed by a 4NX gap. For the general case STS-N where N=1,3, 12,24,48, STS-N corresponds to STS-1, STS-3, STS-12, STS-24, & STS-48. For N multiples of the base frame, N multiples of the base frame formula can be applied. If the frame is broken into STS-1's, then the base frame formula itself can be used. SDH frames can be compounded also and the same formula remains applicable in multiples of the base SDH frame. If the compounded SDH frames are broken into SDH base frames, then the SDH basic frame formula can be applied.

While the invention has been described with reference to particular example embodiments, it is intended to cover all modifications and equivalents within the scope of the following claims.

I claim:

1. A pointer processing circuit for substantially eliminating the pointer gap during justification of an outgoing SONET/SDH frame relative to an incoming SONET/SDH frame by the pointer processing circuit, said SONET/SDH frames having byte locations arranged in columns and rows of the frame, including transport overhead bytes and data payload bytes, said transport overhead bytes including a pointer (H1H2) followed by a negative justification data holding byte location (H3), comprising:

a pointer interpreter circuit (PI) constructed to receive an incoming frame, interpret the pointer (H1H2) from transport overhead bytes of the incoming frame pointing to the start of data payload bytes of the incoming frame, and write data payload bytes of the incoming frame into a first in first out memory (FIFO);

an input clock CLK1 controlling the writing of data payload bytes into the FIFO;

a first in first out memory (FIFO) coupled to the PI for writing data payload bytes of the incoming frame in the FIFO;

a pointer generator circuit (PG) coupled to the FIFO and constructed to read out data payload bytes from the FIFO, create an outgoing frame, and calculate a new pointer for the transport overhead bytes pointing to the start of data payload bytes for the outgoing frame;

an output clock CLK2 controlling reading of data from the FIFO to form an outgoing frame;

said PI, FIFO, and PG cooperating for justification of the outgoing frame relative to the incoming frame in case there is variance between the input clock and output clock, in case a data byte was previously stored in the negative justification data holding byte location (H3) or in case a dummy byte is written in a positive justification data holding byte location following H3;

said PG being constructed to determine the time X between justifications, to count justifications, and to determine the occurrence of N justifications corresponding to a row of N data payload bytes of the frame in the time (N-1)X adjacent to a pointer gap time interval (R+1)X of no justifications corresponding to R transport overhead bytes of the row;

said PG being constructed to average approximately the justifications over the interval X(N+R) by spacing the justifications to occur at intervals of approximately X(1+R/N), thereby substantially eliminating the pointer gap.

2. The pointer processing circuit of claim I wherein the SONET frame comprises byte locations arranged in 9 rows and 90+N columns, the first 3×N columns being transport overhead bytes followed by 87×N columns of data payload bytes, said PG spacing the justifications to occur at intervals of approximately X(1+3×N/87×N), where N=1,3, 12,24,48, etc.

3. The pointer processing circuit of claim 1 wherein the SDH frame comprises byte locations arranged in 9 rows by 270×N columns, the first 9xN columns being transport overhead bytes followed by 261×N columns of data payload bytes, said PG spacing the justifications to occur at intervals of approximately X(1+9×N/26×N where N=1,4, 16, etc.

4. The pointer processing circuit of claim 1 wherein the justifications can be either positive or negative.

5. The pointer processing circuit of claim 4 wherein the PI, FIFO, and PG perform negative justifications or decrements if CLK1>CLK2, each justification writing an extra byte in negative justification data holding byte location (H3) of the outgoing frame.

6. The pointer processing circuit of claim 5 wherein the PI, FIFO and PG perform a negative justification or decrement if a data byte was previously written in the negative justification data holding byte location (H3) of the incoming frame.

7. The pointer processing circuit of claim 5 wherein the PI,FIFO, and PG perform positive justifications or increments if CLK1<CLK2, each justification writing a dummy byte at a data payload byte location following the H3 byte of the outgoing frame.

8. The pointer processing circuit of claim 7 wherein the PI, FIFO, and PG perform a positive justification or increment if a dummy byte was previously written at a data payload byte location following the H3 byte of the incoming frame.

9. A method of substantially eliminating the pointer gap during justification of an outgoing SONET/SDH frame relative to an incoming SONET/SDH frame by a pointer processing circuit, said pointer processing circuit having a pointer interpreter (PI), first in first out memory (FIFO), pointer generator (PG), input clock CLK1 and output clock CLK2, said SONET/SDH frame having byte locations for transport overhead bytes and data payload bytes comprising:

interpreting the pointer from transport overhead bytes of an incoming frame at the PI indicating the position of the start of the data payload bytes of an incoming frame and writing data payload bytes of the incoming frame in the FIFO;

generating a new pointer at the PG pointing to the start of the data payload bytes for an outgoing frame and reading data payload bytes from the FIFO to form the outgoing frame;

justifying the data payload bytes of the outgoing frame relative to the incoming frame in the case of variance between the input and output clocks, in case a data byte was previously stored in the negative justification data holding byte location (H3), or in case a dummy byte is written in a positive justification data holding byte location following H3;

measuring the time between justifications, and counting justifications for a cycle of justifications during read out of data payload bytes adjacent to a pointer gap of no justifications during readout time for transport overhead bytes as the pointer processing circuit steps along a row of a SONET/SDH frame;

and controlling the PG so that the PG substantially averages justifications over a cycle of data payload readout from the FIFO and adjacent pointer gap thereby substantially eliminating the pointer gap.

10. The method of claim 9 comprising controlling justifications to occur at intervals of X(1+R/N) where X is the time between justifications, N is a row of data payload bytes when justifications occur, and R is a set of adjacent transport overhead bytes when justifications do not occur.

11. The method of claim 10 where N-87 and R=3.

12. The method of claim 10 where N=261 and R=9.

13. The method of claim 10 where N=n87, R=n3, and n=1,3, 12, 24, or 48.

14. A method of eliminating the pointer gap during justification of an outgoing SONET/SDH frame relative to an incoming SONET/SDH frame in a pointer processor circuit, said SONET/SDH frame comprising byte locations arranged in a frame of 9 rows by 90 columns, the first three columns comprising transport overhead bytes followed by 87 columns of data payload bytes, said data payload bytes comprising a column of path overhead bytes including the trace byte J1 indicating the start of the frame data payload, said transport overhead bytes comprising the pointer H1H2 pointing to the trace byte J1 comprising:

reading the pointer HIH2 of an incoming SONET/SDH frame in a pointer interpreter (PI) pointing to the start of the frame data payload;

marking the byte following J1 as the byte starting the frame data payload;

writing the data payload bytes of the frame into a first in first out memory (FIFO) according to a first input clock CK1;

reading the data payload bytes out of the FIFO into a pointer generator (PG) which forms an outgoing SONET/SDH frame according to a second output clock CLK2;

generating a new pointer H1H2 in the PG indicating the byte position of the start of the data payload bytes of the outgoing frame;

providing justification of the outgoing frame relative to the incoming frame in the case of variance between the incoming frame input clock CLK1 and outgoing frame output clock CLK2, in case a data byte was previously stored in the negative justification data holding byte location (H3), or in case a dummy byte was previously written in a positive justification data holding byte location following H3;

counting the time X between justifications and counting justifications to determine occurrence of 87 justifications over the time interval 86X followed by a pointer gap of no justifications for the time interval 4X;

and constructing the pointer generator to control the FIFO so that upon determining occurrence of 87 justifications over a time interval 86X followed by a pointer gap of time interval 4X with no justifications, the pointer generator controls the justifications so that justifications occur substantially at intervals $X(1+3/87)$ thereby substantially eliminating the pointer gap.

15. The method of claim 14 wherein the spacings between justifications are rounded off to occur at whole integer intervals.

* * * * *